United States Patent [19]

Derschmidt et al.

[11] 4,344,739
[45] Aug. 17, 1982

[54] HINGELESS AND BEARINGLESS MULTIBLADE ROTOR FOR ROTARY WING AIRCRAFT

[75] Inventors: Hans Derschmidt, Putzbrunn; Hubert Frommlet, Siegertsbrunn, both of Fed. Rep. of Germany

[73] Assignee: Messerschmitt-Boelkow-Blohm GmbH, Munich, Fed. Rep. of Germany

[21] Appl. No.: 143,628

[22] Filed: Apr. 25, 1980

[30] Foreign Application Priority Data

May 16, 1979 [DE] Fed. Rep. of Germany ....... 2919684

[51] Int. Cl.³ .............................................. B64C 27/38
[52] U.S. Cl. .................................. 416/141; 416/134 A
[58] Field of Search ................. 416/134 A, 138 A, 141

[56] References Cited

U.S. PATENT DOCUMENTS

| 3,879,153 | 4/1975 | Breuner | 416/141 |
| 3,999,886 | 12/1976 | Ormiston et al. | 416/138 A X |
| 4,201,515 | 5/1980 | Derschmidt et al. | 416/141 X |
| 4,281,966 | 8/1981 | Duret et al. | 416/134 A |

FOREIGN PATENT DOCUMENTS 2758086 6/1979 Fed. Rep. of Germany ... 416/134 A

Primary Examiner—Everette A. Powell, Jr.
Attorney, Agent, or Firm—W. G. Fasse; D. F. Gould

[57] ABSTRACT

The wing blades of a hingeless and bearingless multiblade rotor are connected to a substantially rigid rotor hub by spar sections elastically twistable and bendable in the flapping direction and in the lead-lag direction. The mounting positions on the periphery of the rotor hub for connection of the spar sections of the respective blades are off-set relative to the angular position of the corresponding blades to which they are connected. Further, the mounting positions for the spar sections of each rotor blade are situated on the periphery of the half side or far side of the rotor hub, facing away from the respective rotor blade. A rear spar section of each mounted rotor blade with reference to the direction of rotation, overlaps the front spar section of the immediately following rotor blade but with free clearance and spacing between the overlapping spar sections in the direction of the rotor axis so that the maximum bendable length of the elastic spar sections is afforded without interference between the blades. The effective or virtual flapping hinges and lead-lag hinges of each blade is shifted closer to the rotor axis thereby minimizing the masses necessary for propeller moment compensation, and static and dynamic balancing of the rotor blades, as well as reducing the required steering forces.

12 Claims, 7 Drawing Figures

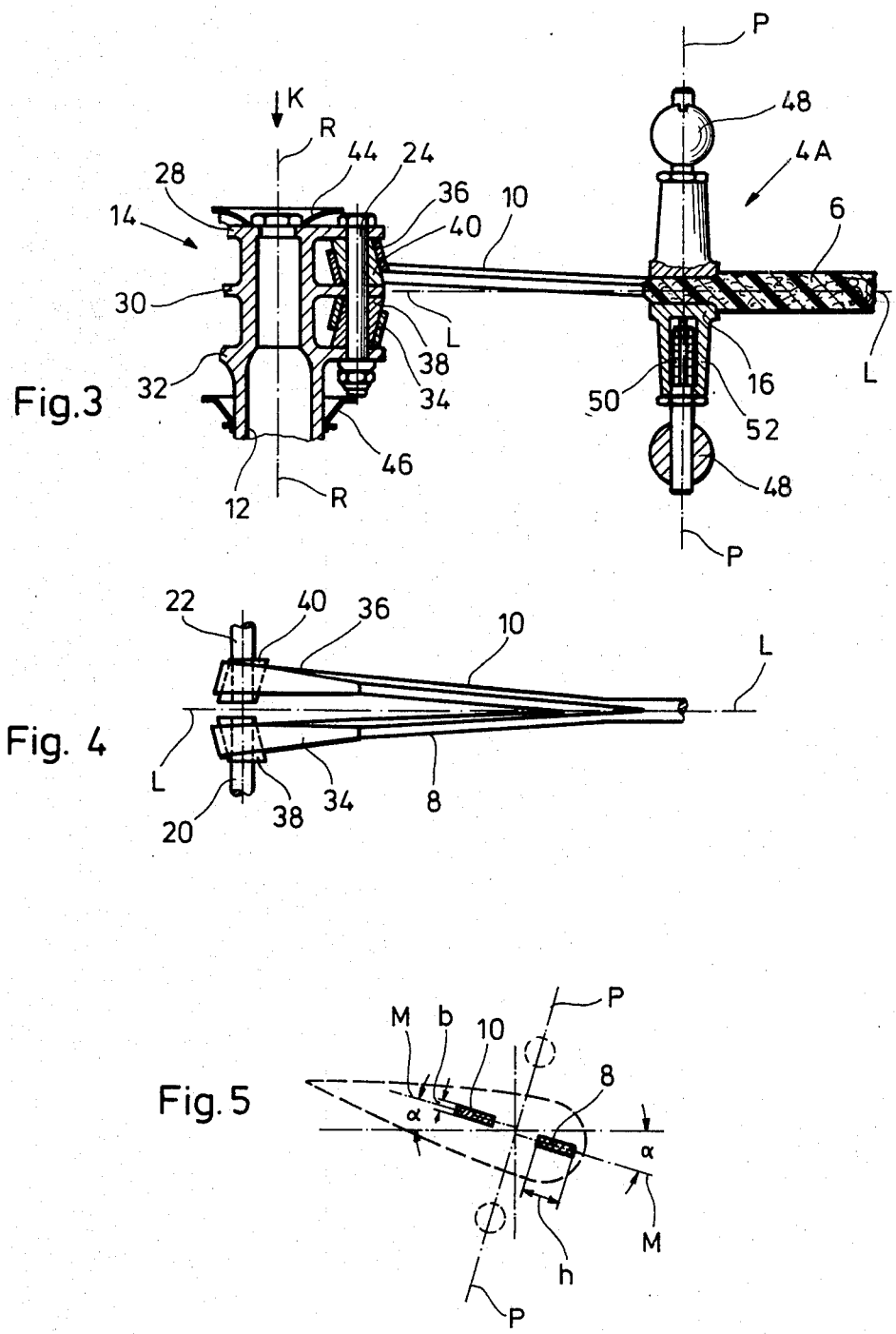

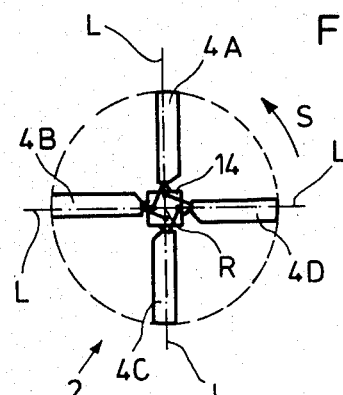
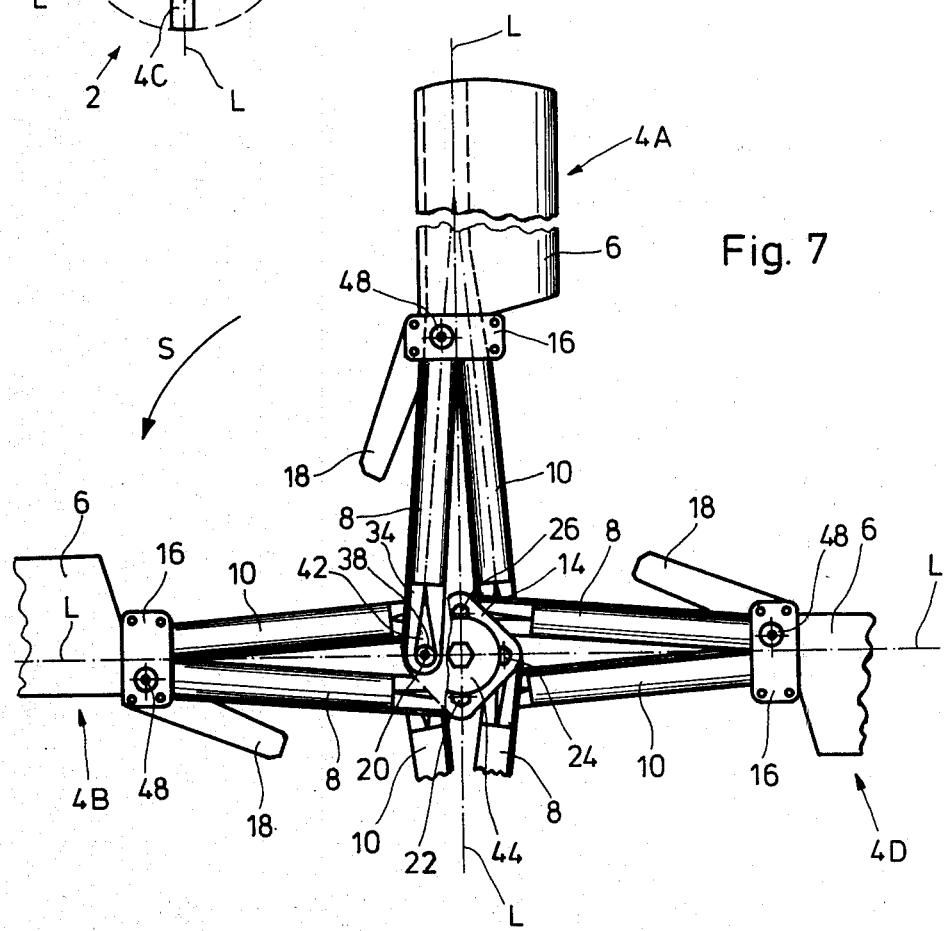

HINGELESS AND BEARINGLESS MULTIBLADE ROTOR FOR ROTARY WING AIRCRAFT

BACKGROUND OF THE INVENTION

The invention relates to a hingeless and bearingless multiblade rotor for rotary wing aircraft, particularly for a helicopter tail rotor. In such rotors, the blade roots of the lift producing wing portions of the rotor blades are each connected to the substantially rigid rotor hub by means of several parallel acting spar sections which are elastically yielding relative to blade angle adjusting torsion loads and which are elastically bendable in the flapping direction as well as in the lead-lag direction. The mounting points of the spar sections are angularly displaced or staggered on the rotor hub in the direction of rotation of the rotor.

Rotors of this type are known wherein several spar sections, which diverge from one another from the airfoil or wing portion toward the rotor hub, are associated with each rotor blade. The spar sections are constructed less resistant to bending in the flapping direction than in the lead-lag direction. The spar sections become twisted between their ends during the blade angle adjustment. These known rotor types have the disadvantage that the fictive flapping hinges, and above all, the fictive lead-lag hinges are located undesirably far from the axis of rotation of the rotor and the freely twistable length of the spar sections is distinctly smaller than the radial length between the axis of rotation of the rotor and the radially outward, airfoil-side spar end, so that comparably high control forces must be applied for the cyclic and collective blade angle control movements.

OBJECTS OF THE INVENTION

In view of the above it is the aim of the invention to achieve the following objects singly or in combination:

to provide a hingeless and bearingless multiblade rotor for use in rotary wing aircraft, especially as a tail rotor;

to construct the multiblade rotor with flexible spar mounted blades so that the control forces required for the blade angle control are substantially reduced;

to shift the effective, fictive or virtual flapping and lead-lag hinges of the respective rotor blades appreciably closer to the axis of rotation of the rotor in comparison to prior art spar section mounted multiblade rotors;

to provide a hingeless and bearingless multiblade rotor with spar mounted blades in which the free length of the spar sections in the region of the rotor hub is increased without lengthening the spar sections at the outer ends where the blade roots are connected to the spar sections;

to provide a spar section mounting for a multiblade rotor with free clearance between the spar sections which allows mutually independent torsional, lateral, and rotational motions of the individual rotor blades without mutual interference;

to eliminate undesirable forces and moments in the vicinity of the rotor hub in spar section mounted multiblade rotors;

to utilize the maximum amount of total cross-sectional surface of the rotor hub in multiblade rotors for the hub side lengthening of blade mounting spar sections, thereby to utilize the largest possible spar length for elastic twisting of the spar sections and to minimize the total mass required for propeller moment compensation and for static and dynamic balancing and to also minimize the forces necessary for steering such rotors; and to construct the connecting spar sections as loops so shaped that tension load peaks are avoided at the connection points, preferably the loops and blades are made of fiber compound materials whereby the fibers run unidirectionally in the radial direction, whereby the fibers run all the way from the blade tip through the loop.

SUMMARY OF THE INVENTION

According to the invention there is provided a hingeless and bearingless multiblade rotor for rotary wing aircraft, wherein the hub side mounting points for the spar sections of each rotor blade are situated on the half side of the rotor hub facing away from the respective rotor blade and are arranged on the hub with mutual spacing in the direction of the rotor axis so that the rear spar section of each rotor blade, with reference to the direction of rotation of the rotor, overlaps with a free clearance the front spar section of the immediately following rotor blade in an arrangement having the same sense for all rotor blades.

The rotor according to the invention increases, as a result of the special position of the hub side mounting points, the free length of the spar sections in the region of the rotor hub without lengthening the spar section at the outer, airfoil side end. This increase is such that the spacing of the fictive or effective flapping hinges and of the fictive lead-lag hinges from the rotor axis may be reduced to a desired extent and at the same time the torsional stiffness of the spar sections which effectively determine the steering forces for the blade angle adjustment is noticeably reduced without impairing its elastic bending characteristics for the flapping and lead-lag hinges. A special feature resides in the mutual overlapping arrangement of the spar sections with a free clearance which allows mutually independent flapping and lead-lag movements of the individual rotor blades without mutual interference. It also allows an identical blade connection for all rotor blades, without the occurrence of a bothersome flow of force in the region of the rotor hub as a result of the effective loads and tilting moments. All in all, the rotor according to the invention shows a substantially better control characteristic because of the favorable position of the fictive or equivalent hinges and due to the small dimensions, and this rotor is particularly useful as tail rotor for a helicopter.

BRIEF FIGURE DESCRIPTION

In order that the invention may be clearly understood, it will now be described, by way of example, with reference to the accompanying drawings, wherein:

FIG. 3 shows schematically a section along the line III—III of FIG. 2;

FIG. 4 shows schematically a view of the spar sections of a rotor blade looking in the direction of the arrows IV—IV of FIG. 2;

FIG. 5 shows schematically a section along the line V—V of FIG. 2;

FIG. 6 shows a schematic top plan view, similar to FIG. 1, of a four blade tail rotor, however, with reverse rotor thrust direction; and FIG. 7 shows an enlarged partial plan view of the tail rotor according to FIG. 6.

DETAILED DESCRIPTION OF PREFERRED EXAMPLE EMBODIMENTS AND OF THE BEST MODE OF THE INVENTION

Figure 1:
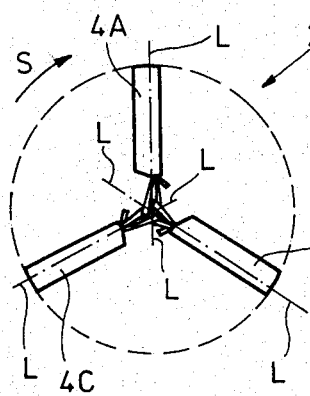
FIG. 1 shows a schematic top plan view of a three-blade tail rotor according to the invention.
Figure 2:
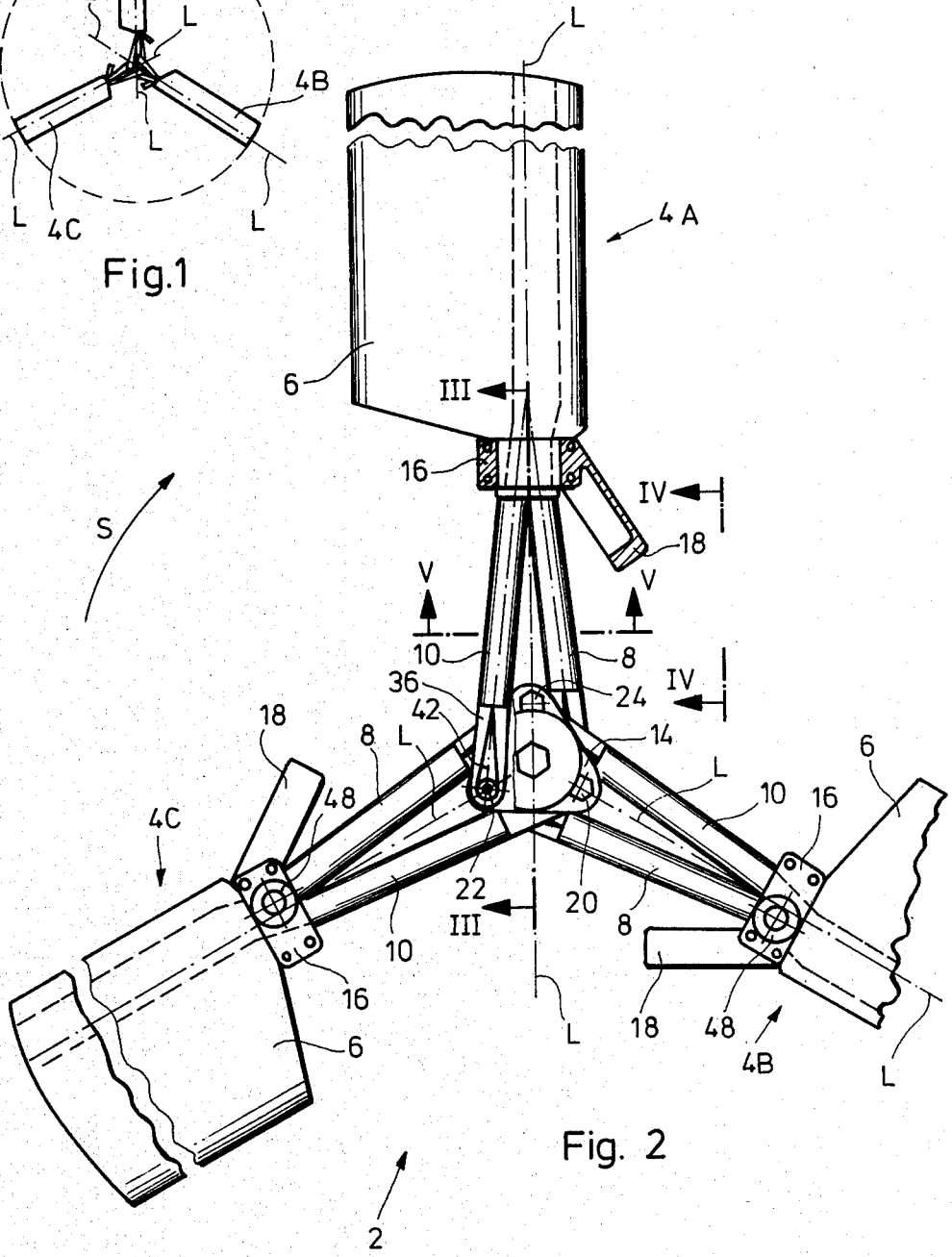
FIG. 2 shows schematically a partial view of the tail rotor according to FIG. 1 on an enlarged scale.

FIGS. 1 to 5 illustrate a three blade helicopter tail rotor 2, which produces a downward thrust K (FIG. 3) in the direction of the axis R of rotation of the rotor, that is, toward the helicopter tail, when the tail rotor 2 turns in the direction of rotation S. The rotor blades 4A, B, C of the tail rotor 2 are each connected to a substantially rigid rotor hub 14 formed at the upper end of the rotor mast 12, wherein the connection is accomplished by means of two V-shaped spar sections 8, 10 diverging from the airfoil section 6 of the rotor blades to the rotor axis R.

The spar sections 8, 10 are made of compound fiber material, for example glass reinforced fiber material, with the fibers extending unidirectionally in the longitudinal direction of the spar. The spar sections 8, 10 are constructed to be torsionally elastic as well as elastically bendable in fictive flapping hinges and in the fictive lead-lag hinges. Thus, the blade angle may be adjusted about the longitudinal blade axis L. More specifically, the spar sections 8, 10 are constructed less resistant to bending in the flapping direction than in the lead-lag direction to provide a better control characteristic of the rotor 2. The airfoil or blade ends of the spar sections are held together by means of a two piece clamp 16 and change into a single piece wing spar shown in FIG. 2 with dashed lines which reaches into the respective airfoil section 6 as far as the blade tip. The twisting of the spar sections 8, 10 and the changing the blade angle of the associated rotor blade about the respective longitudinal or radial axis L is caused by means of a control horn 18 attached to the clasp 16. The control horn 18 is connected to a control rod, not shown, for the cyclic and collective blade angle adjustment.

The hub side ends of the spar sections 8, 10 are connected to the rotor hub 14 by means of the mounting bolts 20, 22, 24 in such a manner, that in each instance two spar sections 8, 10 of neighboring rotor blades are secured by the same mounting bolt, and the mounting bolts associated with each rotor blade are situated on the half side of the rotor hub 14 facing away from this rotor blade. In this manner, the spar section 8 of the rotor blade 4A as well as the spar section 10 of the rotor blade 4C are held by the mounting bolt 20, and the mounting bolts 20, 22 associated with the rotor blade 4A are arranged in the peripheral region on the half side of the rotor hub 14 facing away from this rotor blade 4A.

The mounting bolts 20, 22, 24 are secured to the rotor hub 14 (FIG. 3) on three successive flanges 28, 30, 32 spaced in the direction of the rotor axis, whereby all of the rear spar sections 10, with reference to the rotating direction S of the rotor, are connected between the flanges 28 and 30 and all of the forward spar sections 8, with reference to the rotating direction S of the rotor, are connected between the flanges 30 and 32. That is, in each instance the respective spar sections are connected at the same height on the rotor hub 14 with reference to the axis of rotation R of the rotor. With this feature, a blade connection is obtained which is identical for all rotor blades and an undisturbed elastic deforming of the spar sections 8, 10 over the entire spar length is guaranteed when blade angle control movements, flapping movements, and lead-lag movements are performed.

As is shown most clearly in FIG. 5, the spar sections 8, 10 each have a rectangular cross-section with a substantially larger cross-sectional height "h" than a cross-sectional width "b". The spar sections 8, 10 have a mutual spacing in the direction of the rotor axis, which spacing becomes increasingly larger toward the mounting bolts. The forward spar section 8, with reference to the direction S of rotation of the rotor, is situated above the rear spar section 10 relative to the thrust direction K of the rotor. In addition, the center lines M of the spar sections 8, 10 extending in the direction of the cross-sectional height "h" are also inclined at an angle $\alpha$ of about 10° relative to a plane perpendicular to the axis R of rotation of the rotor. Consequently, the spar sections 8, 10 are constructed substantially less resistant to bending in the flapping direction than in the lead-lag direction, and their center lines M have the same inclination in the untwisted state of the spar sections as does the airfoil, shown in FIG. 5 with dashed lines, in the center of the blade angle adjustment range. Consequently, the maximum torsion angle of the spar sections 8, 10 required during cyclic and collective angular changing of the blades is kept small compared with the untwisted state, and the cross-sectional center lines M of the spar sections 8, 10 extend in parallel to the wing chord in the transition region between the airfoil section 6 and the spar section proper.

The hub side ends of the spar sections 8, 10 are constructed as loops 34, 36, which embrace the associated mounting bolts whereby a sleeve 38 or 40 respectively is interposed between the loop and the bolt. The cylindrical outer surfaces of the sleeves 38, 40 are matched to the inclination of the loops 34, 36, while the central sleeve bore taking up the mounting bolts 20, 22, 24, extends in parallel to the rotor axis R. A filler piece 42 which is also made of (FIG. 2) fiber compound material is inserted between the loop legs of each spar section 8, 10. The cross-sectional width "b" of the spar sections 8, 10 in the loop region becomes increasingly larger toward the hub side mounting point, while the radial wall thickness decreases in the direction of the cross-sectional center line "M". Stress peaks on the hub side mounting points of the spar sections 8, 10 are reduced by these means. The mounting bolts 20, 22, 24 are secured at their upper and lower ends by means of axial stop disks 44, 46, so that the mounting bolts 20, 22, 24 do not fall out in the instance of a bending break and so that the spar sections 8, 10 stay connected to the hub by means of the then shear stressed bolts.

The propeller moment compensation is accomplished in the usual manner by means of compensating weights 48 which are attached to the clamp 16 and are adjustable in the direction of the moment compensating axis P. The trim weights 50 required for balancing the blades are housed in chambers 52 situated on both sides of the blade plane and concentric to the moment compensating axis P (FIG. 3). The weights 50 contribute to the propeller moment compensation and hence respectively reduce the weight of the compensating weights 48.

The example embodiment according to the FIGS. 6 and 7 shows a tail rotor with four rotor blades 4A, B, C, and D and with reverse rotor thrust K, that is, the rotor thrust is directed upwardly relative to the direction of the axis of rotation of the rotor R. The structural elements of the example embodiment of FIGS. 6 and 7 which correspond to those elements of the three blade rotor of FIGS. 1 to 5, are indicated by the same reference numbers. Thus the higher lying, forward spar sections 8 with reference to the direction of rotation S, are connected between the flanges 28 and 30, and the lower lying, rear spar sections 10, with reference to the direction of rotation S, are connected between the flanges 30 and 32 and connected to the rotor hub 14. Stated differently, the blade connection with reference to a plan perpendicular to the axis R of rotation of the rotor is reversely symmetrical to the blade connection of the first example embodiment. Two spar sections 8, 10 of different rotor blades are again supported each with a fitting bushing 38 or 40 respectively interposed between each of the mounting bolts 20, 22, 24 and 26 and the respective spar loop. The spar section connections are arranged with a uniform distribution in the outer, peripheral region of the rotor hub 14. The mounting bolts associated with each rotor blade are also situated in the region of the half side of the rotor hub facing away from this rotor blade, however in this instance, they are situated at the border of the rotor hub half facing toward the rotor blade. Thus, according to FIG. 7, the two mounting bolts 20 and 24, which are located diametrically to the axis R of rotation of the rotor and substantially perpendicular to the longitudinal axis L—L of the rotor blades 4A, C are associated with the spar sections 8, 10 of the rotor blades 4A and 4C. The other two mounting bolts 22 and 26 serve for connecting the blade pair 4B, D. Otherwise, the mutual inserting and the cross-sectional construction of the spar sections 8, 10 and the remaining structural and functional features of this example embodiment correspond to those of the tail rotor according to the FIGS. 1 to 5.

In the light of the above disclosure it will be appreciated that by locating the mounting points of the spar sections in the peripheral region of the rotor hub facing away from the respective rotor blade, substantially all of the total cross-sectional surface of the rotor hub is used for the hub side lengthening of the spar sections. Since the mounting points of corresponding spar sections of the rotor blades are situated in a common plane perpendicular to the rotor axis, and since all mounting points are of identical construction, a uniform load distribution is achieved on the rotor hub according to the invention. Especially in connection with rotors having more than two rotor blades it is suggested to construct the mutual overlapping of the spar sections in such a manner, that the trailing spar section of each rotor blade, with reference to the rotating direction of the rotor, and the leading spar section of the immediately following rotor blade overlap each other in a crossing manner with a mutual spacing in the direction of the rotor axis R.

The leading spar section of the rotor blade as viewed in the direction of rotation, is connected to the rotor hub by means of a mounting point located higher in the thrust direction K of the rotor than the trailing spar section of this rotor blade. This is especially advantageous in the instance when each rotor blade has two V-shaped spar sections diverging from the airfoil or wing means toward the rotor hub because when the spar sections are in the untwisted state a lift producing presetting of the rotor blades may be obtained in combination with an extremely simple construction of the connection or wing or transition region between the spar sections and the airfoil or wing sections. The hub side mounting points preferably each comprise a common mounting bolt for several spar sections of different rotor blades; this mounting bolt is secured on the hub, parallel to the rotor axis, whereby the assembly at the hub side mounting points is simplified and the number of structural components is reduced. In the present instance, a particularly secure supporting of the mounting bolts is obtained in that these bolts are preferably each held in position by vertically spaced flanges of the rotor hub, whereby the bolts are secured against falling out, if a bolt should break, because the flanges from axial stops. Consequently, the rotor blades are held secured to the rotor hub even in the event of a bending break of the bolts due to the still remaining shearing resistance of the bolts.

The spar sections, at their hub side ends, preferably have a cross-section which becomes, toward the associated mounting point, increasingly more resistant to bending in the flapping direction. Further, the spar sections are loop shaped in order to avoid the occurrence of tensile stress peaks at the mounting points and in order to produce an advantageous connection by means of loops having a small radial wall thickness.

The above mentioned dimensioning of the die spar sections so that the height "h" of the rectangular cross-section is greater than the cross-sectional width "b", preferably "$h$"=6b to 3b, has the advantage that in the nontwisted condition of the spar sections, the center lines M extend at an angle to a plane perpendicular to the rotor axis. This special cross-sectional geometry provides a substantially smaller flapping stiffness than the lead-lag stiffness of the spar sections with a minimal torsion resistance. Further, in the untwisted state of the spar sections these spar sections assume a position in the center of the blade pitch adjusting region, whereby blade angle adjustments may be made symmetrically relative to said center with a uniform force requirement for said blade angle adjustment.

The spar sections are preferably made of a compound fiber material with the fibers extending unidirectionally in the longitudinal direction of the spar, whereby the material characteristics are optimally utilized. Additionally, such structure makes possible an extremely simple connection of the spar sections to the associated wing blade and the connection is well suited for the proper load application in accordance with the material characteristics of such fiber compound material, particularly when the spar sections of each rotor blade are constructed as a single piece extending into the wing blade all the way to the blade tip.

By attaching the control horn 18, the clamp 16, the propeller moment compensating weights 48, and the balancing weights 50 in the region where the spar merges into the blade or wing and by placing the weights 48 and 50 along a common axis P, these elements are most effective. Accordingly, the largest possible spar length is utilized for twisting the spar sections, and the total mass of the additional weights required for the propeller moment compensation and the static and dynamic balancing of the rotor blades is substantially reduced, because the trim weights also become effective in the sense of a propeller moment compensation.

Although the invention has been described with reference to specific example embodiments, it will be appreciated, that it is intended to cover all modifications and equivalents within the scope of the appended claims.

What is claimed is:

1. A hingeless and bearingless multiblade rotor for rotary wing aircraft, comprising: substantially rigid rotor hub means having a rotational axis and including a plurality of mounting points around the periphery of the rotor hub means; a plurality of lift producing wing means each having a longitudinal wing axis extending substantially radially relative to said rotational axis, each wing means including its respective blade root and at least two spar sections of elastic material for connecting each wing means to respective ones of said mounting points on the rotor hub means with said at least two spar sections, said spar sections being of substantially equal length and elastically bendable and responsive to loads in the torsional direction extending radially and longitudinally of the wing means, to loads in the flapping direction and to loads in the lead-lag direction, each wing means being connected to the rotor hub means at its mounting points all of which are located in or behind, as viewed radially inwardly along the respective longitudinal wing axis, a plane extending perpendicularly to the respective wing axis and in said rotational axis, whereby the freely twistable length of the spar sections is optimized, said at least two spar sections of a wing means being arranged so that with reference to the direction of rotation of the rotor, the trailing spar section of each rotor blade means overlaps the leading spar section of the immediately following rotor blade, said overlapping spar sections being spaced apart in the axial direction of the rotor, said spar sections thereby forming a staggered, overlapping arrangement.

2. The multiblade rotor of claim 1, wherein the rotor hub means comprises a plurality of planes through the hub means normal to the rotational axis of the hub means, said mounting points being arranged in said plurality of planes and around the outer periphery of the rotor hub means and wherein connecting points of corresponding spar sections are located in a common one of said planes perpendicular to the rotor axis.

3. The multiblade rotor of claim 1, wherein each rotor blade comprises two spar sections diverging from each other in the axial direction of the rotor to form a V-shaped configuration, said two spar sections being connected to the rotor hub means so that, with reference to the direction of rotation, the leading spar section is connected to the rotor hub means at a mounting position in a plane higher in the axial direction than the mounting plane of the respective trailing spar section of each rotor blade means.

4. The multiblade rotor of claim 3, wherein spar sections from a plurality of different blades are coupled to a similar mounting position on the periphery of the hub means by means of a common mounting bolt, said mounting bolt being secured to the hub means in a position parallel to the rotor axis.

5. The multiblade rotor of claim 4, wherein said rotor hub means comprises a plurality of flange means in a plurality of spaced apart planes perpendicular to the rotor axis with mutual spacings in the rotor axis direction between the plurality of flange means and wherein said mounting bolts for mounting a plurality of said spar sections from different rotor blades are secured through the flange means of the rotor hub means and wherein said mounting bolts are secured against falling out by means of axial stop means.

6. The multiblade rotor of claim 1, wherein the spar sections at their rotor hub ends comprise a cross-section adapted to afford an increasing resistance to bending in the flapping direction, said resistance increasing radially inwardly toward the respective mounting point, said spar sections being formed as loops.

7. The multiblade rotor of claim 1, wherein the spar sections comprise a rectangular cross-section with a height, substantially in the direction of rotation, greater than the thickness in the direction perpendicularly to the rotational direction, said spar sections having a center plane (M) extending in the direction of said height in such a manner that in the nontwisted condition of the spar sections, said center planes extending at an angle to a plane perpendicular to the rotor axis.

8. The multiblade rotor of claim 1, wherein the spar sections are made of compound fiber material with the fibers oriented to extend substantially unidirectionally, radially in the longitudinal direction of the spar sections.

9. The multiblade rotor of claim 1, wherein the spar sections for each rotor blade are made as a one piece structure extending from the mounting position on the rotor hub means through the blade to the tip of the blade.

10. The multiblade rotor of claim 1, further comprising trim compensation first weight means and propeller moment compensation second weight means attached to each rotor blade near the juncture of the spar section and the wing blade section of said rotor blade.

11. The multiblade rotor of claim 10, wherein said first and second weight means are arranged on a common axis.

12. The multiblade rotor of claim 1, further comprising blade angle control horn means attached to the outer end of the spar sections on the wing blade side of each rotor blade.

* * * * *